United States Patent
Yang

(10) Patent No.: US 7,322,728 B2
(45) Date of Patent: Jan. 29, 2008

(54) MOUNTING STRUCTURE FOR HIGH-MOUNTED STOP LAMP

(75) Inventor: Jung Kyu Yang, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 133 days.

(21) Appl. No.: 11/302,071

(22) Filed: Dec. 12, 2005

(65) Prior Publication Data

US 2007/0133218 A1    Jun. 14, 2007

(51) Int. Cl.
*F21V 1/00* (2006.01)
*F21V 7/04* (2006.01)
(52) U.S. Cl. ..................... 362/549; 362/541
(58) Field of Classification Search .......... 362/499, 362/541, 549
See application file for complete search history.

(56) References Cited

U.S. PATENT DOCUMENTS

| | | | |
|---|---|---|---|
| 4,614,997 A * | 9/1986 | Montet | 362/549 |
| 4,872,096 A * | 10/1989 | Montet | 362/549 |
| 5,211,466 A * | 5/1993 | Jarocki et al. | 362/540 |
| 6,331,067 B1 * | 12/2001 | Enders | 362/503 |
| 6,955,457 B2 * | 10/2005 | Lee | 362/549 |
| 7,172,322 B2 * | 2/2007 | Pommeret et al. | 362/503 |

FOREIGN PATENT DOCUMENTS

| | | |
|---|---|---|
| JP | 07-309168 | 11/1995 |
| JP | 10-000988 | 1/1998 |
| JP | 2004-082852 | 3/2004 |

* cited by examiner

*Primary Examiner*—Sandra O'Shea
*Assistant Examiner*—James W Cranson, Jr.
(74) *Attorney, Agent, or Firm*—Morgan Lewis & Bockius LLP

(57) ABSTRACT

A structure for mounting a high-mounted stop lamp. An upper housing and a lower housing are not provided. A stop lamp having a reflector and a lens is placed in a space defined by a cover part of a tailgate trim which is formed to have a configuration for receiving the stop lamp therein. A pair of mounting sections protrudes from left and right portions of a rear wall of the reflector. By the medium of the pair of mounting sections, the reflector is locked by bolts to a tailgate inner panel which is positioned above the reflector and is coupled by clips to the cover part of the tailgate trim which is positioned below the reflector.

3 Claims, 4 Drawing Sheets

MOUNTING STRUCTURE FOR HIGH-MOUNTED STOP LAMP

BACKGROUND OF THE INVENTION

1. Field of the Invention

The present invention relates to a tailgate trim high-mounted stop lamp mounting structure.

2. Description of the Prior Art

As generally known in the art in an automotive vehicle, in order to signal a brake operation state to a driver of a following car when a brake pedal is applied, stop lamps are installed at both left and right sides of the rear end of the vehicle body. However, since the stop lamps are generally installed along with tail lamps, if the stop lamps are turned on in the nighttime while traveling with the tail lamps turned on, it is often the case in which the lighted state of the stop lamps cannot be properly recognized by the driver of the following car. Also, in the case that the stop lamps are dim or it is difficult to distinguish at a distance the lighted state of stop lamps from the lighted state of the tail lamps, the driver of the following car cannot properly recognize the turned-on state of the stop lamps of a preceding car.

In particular, in the case that the preceding car travels at a high speed or abruptly stops on a dim road, if the driver of the following car does not precisely recognize the turned-on state of the stop lamps of the preceding car, a serious rear-end collision may occur. Therefore, in order to cope with these problems and improve marketability and outer appearance of a vehicle, a separate stop lamp, that is, a high-mounted stop lamp (HMSL) is additionally installed on a tailgate or a package tray at a rear part of the vehicle.

However, conventional structures for mounting the high-mounted stop lamp can have a number of problems.

For example, while a tailgate upper trim can be mounted around the stop lamp so that the stop lamp and the tailgate upper trim are matched to each other to improve the outer appearance, an excessively large gap may be formed between the stop lamp and the tailgate upper trim when viewed from the bottom to seriously degrade the outer appearance of the high-mounted stop lamp. Also, the gap may be formed at a place exposed to the outside when the tailgate is opened. When the stop lamp and the tail gate upper trim are developed separately from each other it is difficult to match them and a substantial gap is often formed between them.

SUMMARY OF THE INVENTION

Embodiments of the present to provide a tailgate trim, integration type, high-mounted stop lamp mounting structure wherein an upper housing and a lower housing are not provided, instead a stop lamp, having an outer part composed only of a reflector and a lens, is placed in a space defined by a cover part of the tailgate trim, which is formed to have a configuration for receiving the stop lamp therein, such that the reflector is locked by bolts to a tailgate inner panel. The tailgate panel is positioned above the reflector and is coupled by clip means to the tailgate trim which is positioned below the reflector. In this manner a gap between the stop lamp and the tailgate trim is not exposed to the outside and matchability between the stop lamp and the tailgate trim and an outer appearance of the matched section can be improved.

In an exemplary embodiment of the present invention, there is provided a structure for mounting a high-mounted stop lamp, including a tailgate trim having a shape capable of receiving the stop lamp, the tailgate trim having a cover part which defines a space in which the stop lamp is placed, the stop lamp having a reflector and a lens. A pair of mounting sections protrudes from left and right portions of a rear wall of the reflector. A tailgate inner panel is positioned above the reflector, the reflector being locked through the mounting sections by bolts to the tailgate inner panel. A clip means for couples the reflector to the cover part of the tailgate trim, which is positioned below the reflector. The clip means my include a main clip means for locking the mounting section of the reflector and an upper surface of the cover part of the tailgate trim to each other, and an auxiliary clip means for locking a lower surface of the reflector and the upper surface of the cover part of the tailgate trim to each other.

According to another aspect of the present invention, the main clip means may include a fitting portion which is formed on a distal end of the mounting section and has a circular column-shaped configuration, and a clip protruding upward from the upper surface of the cover part of the tailgate trim at a position corresponding to the fitting portion to allow the fitting portion to be fitted therein.

According to still another aspect of the present invention, the auxiliary clip means may include a hook engagement portion which is formed on a lower front portion of the reflector, and an engagement hook which is upward projectedly formed on the upper surface of the cover part of the tailgate trim at a position corresponding to the hook engagement portion to be engaged into the hook engagement portion.

BRIEF DESCRIPTION OF THE DRAWINGS

The above and other objects, features and advantages of the present invention will be more apparent from the following detailed description when taken in conjunction with the accompanying drawings, in which.

DETAILED DESCRIPTION OF THE PREFERRED EMBODIMENTS

Figure 1A:
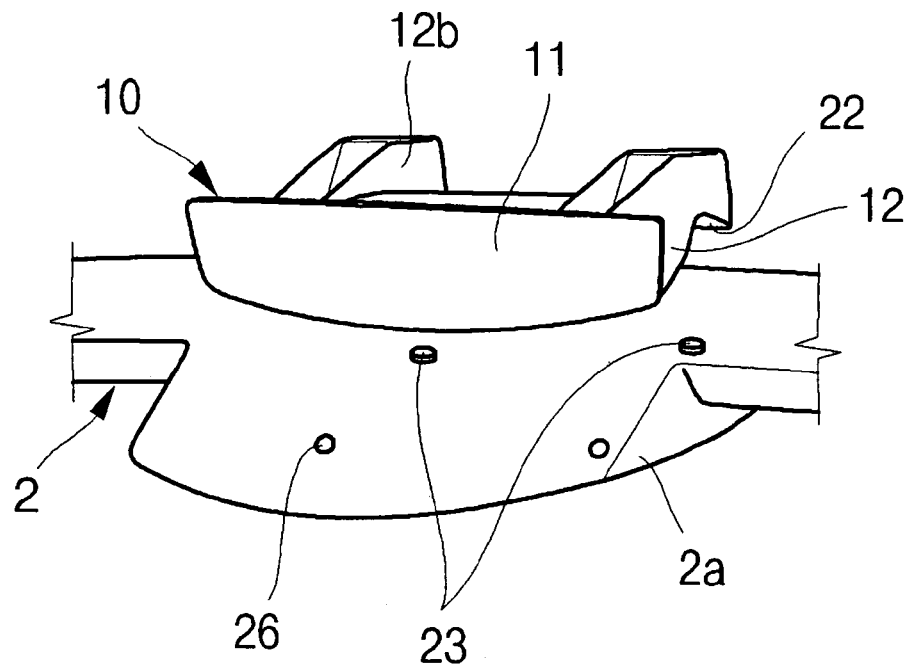
FIGS. 1a and 1b are perspective views illustrating a mounting structure of a high-mounted stop lamp in accordance with a preferred embodiment of the present invention.
Figure 1B:
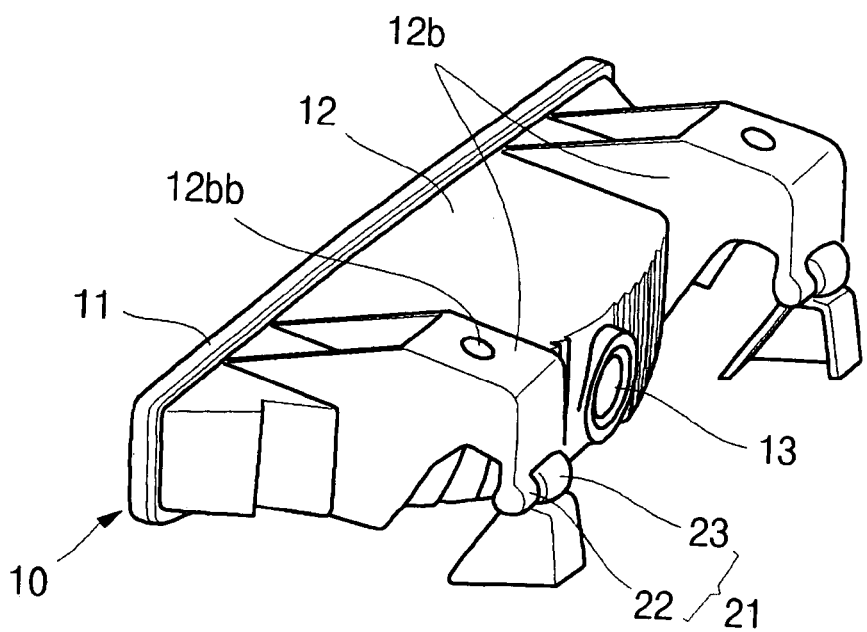
Figure 2:
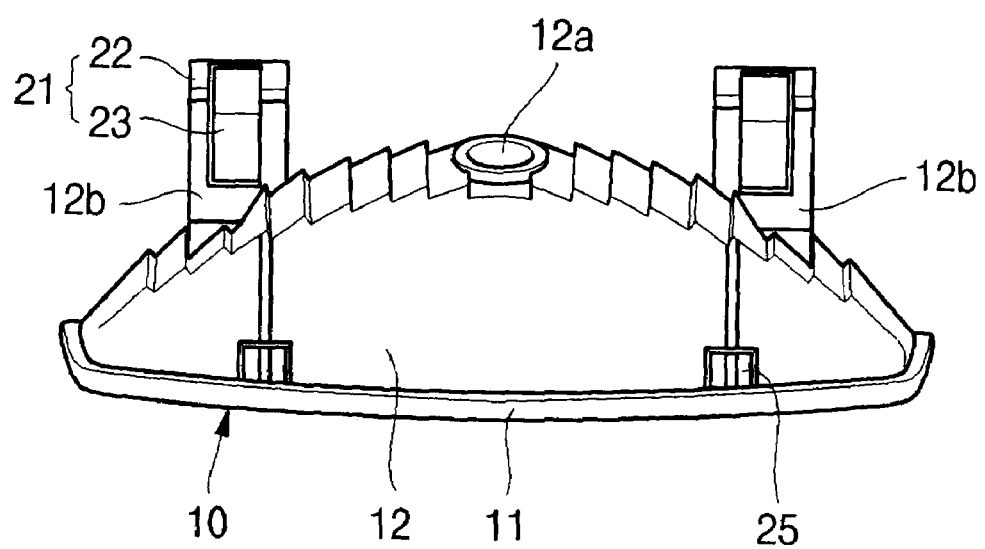
FIG. 2 is a bottom view of the high-mounted stop lamp, illustrating the mounting structure of a high-mounted stop lamp according to the present invention.
Figure 3:
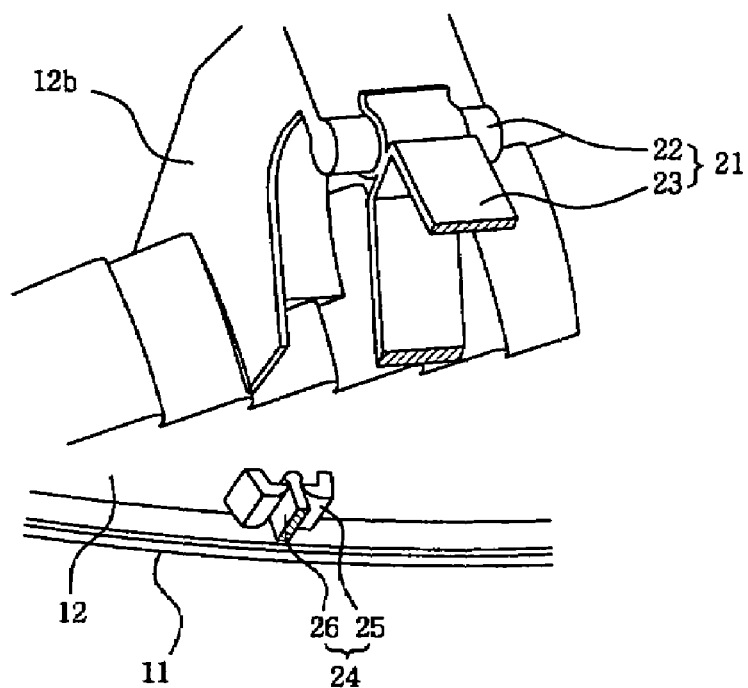
FIG. 3 is an enlarged perspective view illustrating a hook engagement portion of a reflector and an engagement hook of a trim in the mounting structure of a high-mounted stop lamp according to the present invention.

Hereinafter, a preferred embodiment of the present invention will be described with reference to the accompanying drawings. In the following description and drawings, the same reference numerals are used to designate the same or similar components, and so repetition of the description on the same or similar components will be omitted.

As shown in the drawings, in a high-mounted stop lamp 10 according to an exemplary embodiment of the present invention, a front lens 11 and a rear reflector 12 are assembled with each other. A lamp 13 is installed through a lamp mounting hole 12a which is defined at the center portion of the rear wall of the reflector 12, to be positioned inward of the lens 11.

An upper housing and a lower housing which are otherwise provided in the conventional art are removed. Instead, the reflector 12 and the lens 11 constitute an outer part of the stop lamp 10.

The stop lamp 10 is upwardly locked to a tailgate inner panel 4 by bolts 17 to be securely held thereto. The reflector 12 is directly locked to the tailgate inner panel 4, and is also directly locked to a tailgate upper trim 2 which has a configuration capable of covering the lower portion of the reflector 12. The stop lamp 10 is mounted between the tailgate inner panel 4 positioned upward and the tailgate upper trim 2 positioned downward.

A portion of the tailgate upper trim 2 which corresponds to a mounting position of the stop lamp 10 is formed in the shape of a cover part capable of receiving the stop lamp 10 therein. The cover part 2a of the tailgate upper trim 2 defines a mounting space for the stop lamp 10.

The cover part 2a of the tailgate upper trim 2 is formed to have substantially the same contour as the stop lamp 10. The cover part 2a covers the stop lamp 10 from the bottom. The cover part 2a is formed to match a peripheral line of the lens 11 without creating a gap when viewing the stop lamp 10 from the front.

Figure 4:
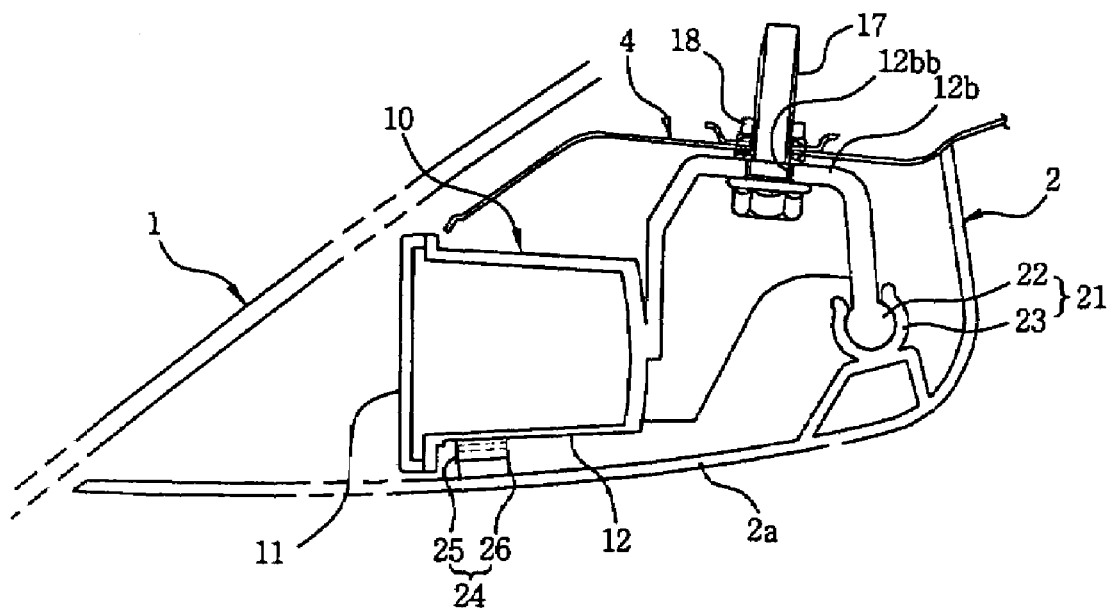
FIG. 4 is a cross-sectional view illustrating the mounting structure of the high-mounted stop lamp according to the present invention.
Figure 5:
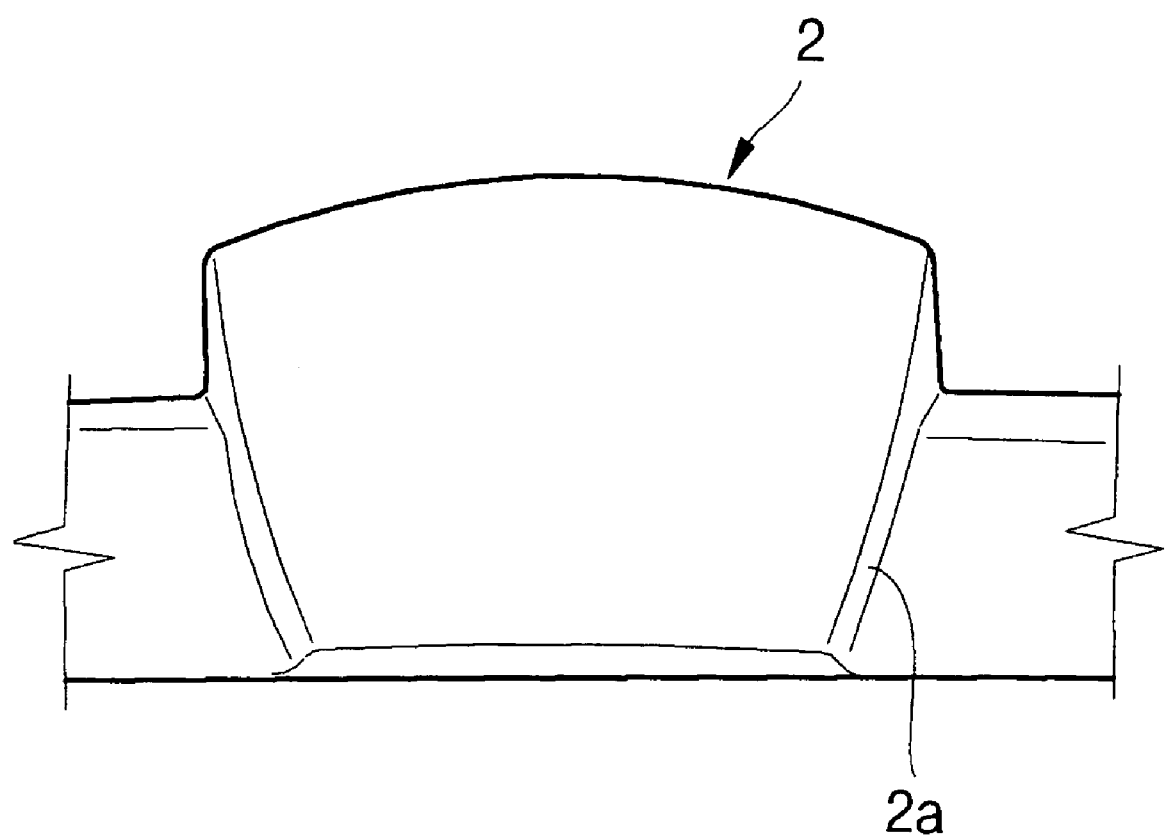
FIG. 5 is a bottom view of a trim to which the high-mounted stop lamp is mounted.

In particular, as shown in FIG. 4, the cover part 2a has a structure which projects forward through a substantial length. The projected portion of the cover part 2a functions to cover the gap between the lens 11 and the tailgate upper trim 2 when a tailgate is opened and viewed from the bottom (see FIG. 5). Reference numeral 1 indicates the tailgate window glass.

A pair of bracket-shaped mounting sections 12b, which are locked to the tailgate inner panel 4 by the bolts, project rearward from the left and right sides of the rear upper surface of the reflector 12. Main clip means 21 includes, a fitting portion 22, which has a circular column-shaped configuration is formed on the distal end of each mounting section 12b, and a clip (hereinafter, referred to as a "trim clip") 23 projecting upward from the upper surface of the cover part 2a of the tailgate trim 2 at a position corresponding to the fitting portion 22, so that the fitting portion 22 can be fitted into the trim clip 23.

Each mounting section 12b is formed to have an inner space. In a state in which the upper surface of each mounting section 12b is brought into contact with the lower surface of the tailgate inner panel 4, after introducing the bolt 17 into the inner space and then inserting the bolt 17 into a locking hole 12bb, a nut 18 is locked to the bolt 17 on the tailgate inner panel 4.

As auxiliary clip means, a hook engagement portion 25 is formed on the lower front portion of the reflector 12, and an engagement hook 26 projects upward on the upper surface of the cover part 2a of the tailgate upper trim 2 at a position corresponding to the hook engagement portion 25, so that the engagement hook 26 can be engaged into the hook engagement portion 25.

When mounting the stop lamp 10, the mounting sections 12b, which are formed integrally with the reflector 12, and the tailgate inner panel 4 are locked to each other using the bolts 17 and nuts 18, the stop lamp 10 is first fastened to the tailgate inner panel 4. Then, after the fitting portions 22, which are formed at the distal ends of the mounting sections 12b of the reflector 12, are fitted into the trim clips 23, formed on the upper surface of the tailgate upper trim 2, by engaging the engagement hook 26, which is formed integrally with the upper surface of the tailgate upper trim 2, into the hook engagement portion 25, which is defined on the lower surface of the reflector 12, the stop lamp 10 is fastened to the tailgate upper trim 2.

Since the fitting portion 22 of the mounting section 12b of the reflector 12 has the circular column-shaped configuration, as the trim clip 23 rotates about the fitting portion 22 of the mounting section 12b, the engagement hook 26 on the upper surface of the tailgate upper trim 2 can be engaged into the hook engagement portion 25 on the lower surface of the reflector 12.

As apparent from the above description, in the tailgate trim integration type high-mounted stop lamp mounting structure according to embodiments of the present invention, an upper housing and a lower housing are not provided, and a stop lamp having an outer part composed only of a reflector and a lens is placed in a space defined by a cover part of a tailgate trim which is formed to have a configuration for receiving the stop lamp therein, such that the reflector is locked by bolts to a tailgate inner panel which is positioned above the reflector and is coupled by clip means to the tailgate trim which is positioned below the reflector. As a result, at least the following advantages are provided: Since the tailgate trim is installed in the shape of receiving the stop lamp therein, a gap between the stop lamp and the tailgate trim (a tailgate upper trim) which is viewed when a tailgate is opened is not exposed to the outside, and matchability between the stop lamp and the tailgate trim and an outer appearance of the matched section can be improved. Because an upper housing, a lower housing and a blanking cover which are otherwise provided in the conventional high-mounted stop lamp can be removed from the stop lamp, the number of component parts, a manufacturing cost, the weight of the stop lamp and the number of manufacturing processes decrease. Due to the fact that a clip structure for directly locking and thereby integrating the stop lamp and the tailgate trim to and with each other is adopted, the fastening force between the two elements is increased and it is possible to prevent the stop lamp from vibrating.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A structure for mounting a high-mounted stop lamp, comprising:

a tailgate trim having a shape configured and dimensioned for receiving the stop lamp, the tailgate trim having a cover part that defines a space in which the stop lamp is placed, the stop lamp having a reflector and a lens;

a pair of mounting sections protruding from left and right portions of a rear wall of the reflector;

a tailgate inner panel positioned above the reflector, the reflector being locked through mounting sections by bolts to a tailgate inner panel; and clip means for coupling the reflector to the cover part of the tailgate trim, which is positioned below the reflector, wherein the clip means comprises a main clip means for locking the mounting section of the reflector and an upper surface of the cover part of the tailgate trim to each other, and an auxiliary clip means for locking a lower surface of the reflector and the upper surface of the cover part of the tailgate trim to each other.

2. The structure as set forth in claim 1, wherein the main clip means comprises:

a fitting portion formed on a distal end of the mounting section with a circular configuration; and a clip protruding upward from the upper surface of the cover part of the tailgate trim at a position corresponding to the fitting portion to allow the fitting portion to be fitted therein.

3. The structure as set forth in claim 1, wherein the auxiliary clip means comprises:

a hook engagement portion formed on a lower front portion of the reflector; and an engagement hook protruding upward from the upper surface of the cover part of the tailgate trim at a position corresponding to the hook engagement portion to be engaged into the hook engagement portion.

* * * * *